United States Patent Office 2,909,443
Patented Oct. 20, 1959

2,909,443

PROCESS OF MAKING POLYETHYLENE FILM RECEPTIVE TO ORGANIC COATING

Leon E. Wolinski, Buffalo, N.Y., assignor to E. I. du Pont de Nemours and Company, Wilmington, Del., a corporation of Delaware No Drawing. Application September 29, 1953
Serial No. 383,146

6 Claims. (Cl. 117—16)

This invention relates to the surface treatment of structures of thermoplastic polymeric materials and, more particularly, to a process of roughening the surface of a polyethylene film to promote the adhesion thereto of polymeric coatings, printing inks, adhesives and the like.

United States Patent No. 2,219,700 to Perrin et al. discloses and claims a polyethylene film, i.e., a film of a solid polymer of ethylene. In general, polyethylene films are tough, semi-transparent, resistant to many chemicals, exhibit a high degree of moisture vapor impermeability, permit the passage of oxygen, and are heat-sealable. Because of this combination of properties, polyethylene films are highly useful for packaging and wrapping a great variety of materials such as chemicals, fresh produce, dried milk, textiles, hardware, etc. One of the most troublesome disadvantages of polyethylene film for use in the packaging field is the fact that standard aniline and rotogravure printing inks employed for printing various cellulosic films, such as regenerated cellulose and cellulose acetate films, do not adhere satisfactorily to the surface of the film. Generally, any indicia, such as trade marks, advertising indicia, recipes, etc., imprinted upon the surface of a polyethylene film with standard oil or lacquer type inks employed for printing cellophane film are easily smeared or rubbed off by the normal abrasions suffered by packages during shipping, handling, etc. Hence, in order to obtain satisfactory adhesion between a dried ink and a polyethylene film surface, it is necessary to employ a specially compounded ink or to modify the film surface to promote improved ink adhesion.

Moreover, although polyethylene film is an exceedingly versatile wrapping material, it has only limited application in certain fields of use wherein increased clarity, increased stiffness, decreased permeability to organic vapors, oxygen, carbon dioxide, increased gloss, decreased permeability to oils and greases, increased dyeability, and increased abrasion resistance are required. It has been found that one or more of these properties may be improved by applying relatively thin coatings of other polymeric thermoplastic film-forming compositions to the surface of a polyethylene film. However, practically all polymeric coatings, except those which are substantially chemically identical to polyethylene, e.g., copolymers of ethylene with other polymerizable materials, the copolymer containing a major proportion of polyethylene, exhibit extremely poor adhesion to the surface of a polyethylene film.

An object of the present invention, therefore, is to provide a process of roughening the surface of a thermoplastic polymeric structure, e.g., film, to improve the adhesion thereto of other base materials. Another object of the present invention is to provide a process of roughening the surface of a polyethylene structure, e.g., film, to improve adhesion thereto of standard printing inks, i.e., promote adhesion of standard aniline and rotogravure inks employed in printing on cellophane film. Another object is to provide a process of treating the surface of polyethylene film to improve adhesion thereof to various other materials, such as metals, glass, paper, nitrocellulose coatings, and other polymeric coatings, e.g., polyamides, vinyl and vinylidene type polymers, rubber and synthetic rubber compositions, etc. A further object is to improve the adhesion of a polyethylene film to itself and other materials when using commercial adhesives. A still further object is to provide a process of treating the surface of a polyethylene film to improve adhesion thereto of dried ink impressions and not impair the transparency of the film. A still further object is to provide a polyethylene film having modified surface characteristics such that dried ink imprints on the surface will not rub off when treated in accordance with the various tests described hereinafter. Other objects will be apparent from the following description of the invention.

These objects are realized by the present invention which, briefly stated, comprises embedding into the surface of a thermoplastic polymeric structure, e.g., film, solid particles having their greatest dimension no greater than one-half the thickness of the structure, and not to exceed 50 microns.

The present invention resides in the discovery that embedment of solid particles into the surface of thermoplastic polymeric film effects a surface roughening which greatly improves the printability of the film and the adhesion of the film to polymeric coatings, adhesives, etc., without materially affecting the original degree of transparency of the film, provided that the solid particles are no greater than one-half the thickness of the film, and not to exceed 50 microns in size; that is, the greatest dimension of any particle must not be greater than one-half the thickness of the film, and in no instance will the greatest dimension of any particle exceed 50 microns.

The term "embedment," as used hereinafter, is meant to apply to conditions wherein the particles protrude from the film surface, i.e., the particles are not completely covered by the polymer, and conditions wherein the particles are actually embedded to such a depth that they are completely covered by the polymer. Where a particle is completely covered, a mound of polymer is formed upon the film surface where the particle entered the film.

A critical aspect of the present invention, insofar as producing a roughened thermoplastic polymeric film having a degree of transparency and a surface texture substantially equivalent to the untreated film is concerned, involves the particle size of the particles being embedded into the film surface. That is, the greatest dimension of each individual particle should be no greater than one-half the thickness of the film, and not to exceed 50 microns. Embedment of particles greater than one-half the thickness of the film (in the case if films less than 0.004" in thickness) results in substantial impairment of the original transparency of the film. On the other hand, embedment of particles greater than 50 microns (in the case of films having a thickness of 0.004" and greater) results not only in substantial impairment of the original transparency of the film, but also results in roughening the surface to such an extent that the surface texture is drastically modified; i.e., the roughened surface is actually perceptible when touched.

The type of particle which may be embedded into a polyethylene film surface may vary widely with respect to composition providing the particles are no larger than one-half the thickness of the film, and do not exceed 50 microns. In some cases, the choice of a particular particle to be embedded, for example, when the particles are to be applied by spraying, will depend upon the availability of stable dispersions or suspensions of the polymers in a non-solvent medium, such as water. It is important to emphasize, however, that certain compositions in particle form have been proven to be outstanding for improving the printability and general adhesiveness of a polyethylene film to polymeric coatings, adhesives, etc. For example, colloidal or hydrophilic particles of silica, the particles being within the preferred size range, are readily available in the form of stable dispersions in water, and silica particles have been found to roughen a polyethylene film surface sufficiently to improve the adhesiveness of the polyethylene film to the various materials discussed herein without impairing the original transparency of the film. In general, however, various organic materials which are satisfactory include polymeric compositions such as rubber and synthetic rubbers, e.g., neoprene, butadiene/styrene copolymers, and polysulphide rubbers, polyethylene, chlorinated polyethylene, chlorosulfonated polyethylene, cellulose derivatives such as cellulose acetate, cellulose acetate butyrate, etc. On the other hand, various inorganic compositions which may be employed include metals of all types including iron (stainless steel), cadmium, zinc, lead, copper, nickel, tin, and aluminum. Various salts and oxides of the metals are also highly useful. Generally, however, the particular composition of the particles to be embedded should not be soluble in water. Other inorganic compositions which have been proven to be satisfactory include alumina and calcium carbonate.

When solid particles of thermoplastic polymers (at least initially thermoplastic) are employed for embedding into the surface of a polyethylene film, the polymer particles should not soften below 90° C., which is the lower limit of the crystalline melting point range of polyethylene, i.e., the range being 90°–104° C. In the case of polymer particles having a crystalline structure, the term "not soften below 90° C." means that the beginning of the crystalline melting point range should not be below 90° C. The beginning of the crystalline melting point range may be defined as the lowest temperature at which the crystalline structure begins to disappear at an appreciable rate as measured by X-ray examination, infrared studies, or by measurement of heat content as carried out by Raine, Richards and Ryder and reported in Trans. Faraday Soc., 41, 61 (1945). For example, in the case of polyethylene at 90° C., half of the crystalline structure remains.

When solid particles of substantially amorphous polymers are to be embedded, the softening point (or the lowest temperature at which the polymer begins to soften), which should not be below 90° C., may be measured by following the simple procedure of stroking a sample of the polymer across the surface of a smooth metal which may be heated gradually to elevated temperatures. The metal surface may be a brass block, or any suitable temperature gradient bar. The lowest temperature at which the substantially amorphous polymer begins to soften must be 90° C. or above.

In addition to the surface treatment of polyethylene structures, the present process may be employed to roughen the surface of structures of any other polymeric thermoplastic material which do not readily adhere to printing inks, polymeric coatings or to other base materials when using standard adhesives. Such polymeric materials include polyethylene terephthalate, the polyamides, polyvinyl fluoride, polymeric formaldehyde, rubber hydrochloride, vinylidene chloride polymers and copolymers of ethylene with other polymerizable materials such as styrene, vinyl acetate, isobutylene, butylene and other olefins. However, because of the aforementioned present and potential commercial importance of polyethylene film, the present invention will be more particularly described with specific reference to this latter material.

Any of a wide variety of techniques may be employed for carrying out the actual step of embedding the particles into one or both surfaces of a polymeric thermoplastic film. However, in all cases, it has been found that the film surface must be soft enough, that is, molten (plastic) or amorphous and hot, to permit the particles to become embedded in the surface. It should be pointed out that the film may be initially cool and solid, but may be made soft enough for embedment by impinging hot particles, i.e., at a temperature above the melting point of the polymer, upon the surface of the film. On the other hand, the particles may be hot-pressed into a solidified, crystalline polymeric film surface.

The following examples of preferred embodiments will serve to illustrate some of the various techniques which may be employed for carrying out the process of the present invention. These examples describe the various techniques with specific reference to polyethylene, but it should be understood that they may be readily applied to other thermoplastic polymeric films as stated hereinabove.

In all of the following examples illustrating embedment of solid particles into the surface of a polyethylene film, it should be understood that the polyethylene film is being formed or has been formed in accordance with well known process steps. That is, a molten polyethylene maintained at a temperature between 150° and 350° C. is extruded through a slot orifice vertically downward through an air gap having a length of from 5″ to 15″, and thereafter onto a quench drum and into a quench bath, normally containing water within a temperature ranging from 30° to 90° C., and preferably about 60° C. In other variations of the process, the film may be extruded into an air gap and thereafter directly into a quench bath without passing over the peripheral surface of a quench drum. It has been found most advantageous to carry out embedment of the particles into a surface of a polyethylene film at one of the following points in the conventional process of extruding a polyethylene film:

(1) In the air gap between the lips of the slot orifice and the quench bath;
(2) On the surface of a quench drum positioned below the air gap;
(3) In the quench bath;
(4) Immediately following the quench bath;
(5) In a sizing bath located immediately after the quench bath.

In the normal process of extruding polyethylene film, the polymer is extruded from a melt maintained at a temperature of about 275° C., and the temperature is not reduced appreciably below this temperature until the molten film is permitted to contact the surface of a quench drum, normally maintained at about 60°–65° C., or until the molten film is extruded directly into a quench bath, normally maintained at about 60°–65° C.

*Example 1*

A "De Vilbiss" spray gun was employed to spray an aqueous suspension of colloidal particles of silica, having a particle size of 17 millimicrons, the dispersion having a concentration of 20% solids. The spray gun was placed at a distance of 3 inches from the film at a point between the lips of the extrusion die and a quench drum positioned below the air gap. The air pressure employed in the gun was 80 p.s.i., and the film was moving at a rate of 20′ per minute. In other words, the film (about 0.004″ in thickness) was sprayed at a point substantially immediately after it emerged from the lips of the extrusion orifice, and at this point the film was in molten condition and at a temperature of about 275° C.

*Example 2*

In this example, the film was sprayed with the same type of apparatus described in Example 1, and the conditions were substantially the same except that the spray of colloidal silica particles was directed upon the film (about 0.004" in thickness) at a point immediately before the film was passed onto the surface of a quench drum maintained at about 65° C. The film was molten at the point immediately before contacting the quench drum, but its temperature was somewhat, e.g., 5°–10°, below the temperature at which the film was being extruded.

*Example 3*

In this example, the polyethylene film was again sprayed with particles of colloidal silica from an aqueous suspension and using the same apparatus of Example 1. The application of the spray was at a point substantially immediately after the molten polyethylene film (about 0.004" in thickness) contacted the surface of a rotating quench drum maintained at about 65° C. In other words, the film was in a solidified condition, but necessarily still amorphous; and to insure application of the spray upon an amorphous film, the spraying step was carried out in less than 4 seconds after the film emerged from the lips of the extrusion orifice. It is important to emphasize that a polyethylene film begins to crystallize substantially immediately after quenching, and the time which elapses prior to beginning of crystallization depends upon the temperature at which the film is quenched. Quenching at higher temperatures delays the beginning of crystallization; for example, the crystallization half life is approximately 30 seconds at 100° C. and 3–4 seconds at 90° C. However, quenching at temperatures below 65° C. is required in order to obtain a film having optimum physical properties. In employing the method illustrated in this example, it is highly important that the film be substantially entirely amorphous at the time the spray of particles is applied; and to be sure that the film is still amorphous, spraying or, in general, embedment of solid particles into the surface of a polyethylene film should be carried out at a point substantially immediately following quenching of the molten polyethylene film.

The roughened surfaces of the polyethylene film produced in accordance with Examples 1–3 exhibited excellent printability when imprinted with standard oil and lacquer type inks in accordance with the tests described hereinafter.

In evaluating the printability, i.e., the strength of the adhesive bond between a dried ink impression and the roughened polyethylene film surface, five tests were employed; and on the basis of the results of all of the tests, the films were rated either acceptable or not acceptable, and, if acceptable, either excellent or good. Four different inks were used to imprint the roughened surfaces of the polyethylene film, and each printed sample was evaluated in accordance with each of the five tests which will be described hereinafter. The inks employed were as follows:

(1) Aniline Cellophane Ink (Bensing Brothers & Deeney, No. W–400).

(2) Aniline Polyethylene Ink (Interchemical Corporation, No. PA–red).

(3) Rotogravure Cellophane Ink (Bensing Brothers & Deeney, No. G–1037).

(4) Rotogravure Polyethylene Ink (Interchemical Corporation, IN–Tag–Red, GPA Red).

In preparing the printed samples of polyethylene film, the ink was applied with a commercial ink spreader which comprised a steel rod having fine wire wrapped around the rod. The spreader produced a multiplicity of fine lines. The ink was then dried for three minutes at 70° C. and thereafter permitted to cool to room temperature. Each sample was then tested in accordance with each of the following tests, and the amount of ink rubbed off and/or removed was noted:

(1) *Rub test.*—The inked polyethylene surface was rubbed 10 times against a hard white paper.

(2) *Scratch test.*—The back of a fingernail was rubbed across the inked surface.

(3) *Flex test.*—The film was held between thumb and forefinger (2" apart) and flexed vigorously.

(4) *Pressure-sensitive tape test.*—A pressure-sensitive tape was pressed against the printed surface and then pulled off.

(5) *Twist test.*—The printed film was folded once and then again in a direction perpendicular to the first fold. The folded ends were then twisted once around, and thereafter the film surface was examined for smearing and/or cracking of the dried ink.

*Examples 4–6*

In these examples, the technique and conditions of Examples 1–3, respectively, were duplicated except that fine particles of polyvinyl chloride ("Geon" 352 Latex) dispersed in water were sprayed with the same apparatus described in Example 1 onto the surface of a polyethylene film. The particles of polyvinyl chloride were about 0.2 micron, and the latex contained 54–56% solids.

The roughened surfaces of the films produced in accordance with Examples 4–6, inclusive, exhibited excellent printability with the four inks described above.

*Example 7*

The particular procedure described in Example 1 was repeated, that is, using the same apparatus and spraying the particles upon a molten polyethylene film (about 0.004" in thickness) surface, except that the particles were dry and, hence, were applied or sprayed in the form of a dust. Particular materials which were sprayed upon the molten film surface included particles of hydrophobic colloidal silica, having a basic particles size within the range of 8–10 millimicrons (agglomerates thereof having their greatest dimensions within the range from 1–1½ microns), carbon black particles (9–80 millimicrons particle size), calcium carbonate (0.145 micron—average particle diameter) and calcium carbonate having an average particle diameter of 0.05 micron.

In all cases, excess particles which may have been deposited on the film surface were washed and scrubbed to remove the loose particles. Roughened polyethylene film produced in accordance with the above example exhibited excellent printability with the inks specified hereinbefore.

*Example 8*

This example illustrates the application of solid particles to a fully solidified, crystalline, polyethylene film. In this process, the polyethylene film (about 0.0015" in thickness) was extruded into an air gap, and then directly into a quench bath maintained at about 65° C. Adjacent to the quench bath was a sizing bath containing an aqueous dispersion of particles of colloidal silica, having an average particle size of about 17 millimicrons, the solution containing about 0.1–0.5% of a suitable wetting agent. Normally, the sizing bath contained about 20% solid particles; but as low as 10% solids can be employed to produce a polyethylene film of excellent printability. In this procedure, the quenched polyethylene film was conducted directly into the sizing bath to coat the film with the particles of silica. Immediately thereafter, the coated surfaces were exposed to a blast of hot air from electrically heated tubes positioned about 2" away from the surface of the film. The air issuing from the tubes was at a temperature of about 250° C., and the hot air served to melt the surface slightly; and the pressure of the air was sufficient to melt the polyethylene film surface and force the solid particles into the film. The hot blast of air is applied only to one side of the film while the opposite side is supported against a quench drum maintained at about 65° C. The printability of the resulting film was excellent.

*Example 9*

The general procedure of Example 8 was repeated except that the film containing deposited particles of silica upon its surfaces was exposed to dielectric heating of the particles using micro waves. The particles thus heated melted the adjacent film surface and the particle became embedded in the surface of the film. Generally, sizing the polyethylene film in a bath containing 30% solid colloidal silica particles, followed by subjecting the film surface to dielectric heating for one minute, produces a polyethylene film which exhibits excellent printability.

*Example 10*

The procedure employed in this example is similar to that of Example 8, except that the particles of silica deposited upon the polyethylene surface were embedded into the surface by employing pressure rolls maintained at about 140° C. The approximate pressure was 320 p.s.i., and the solids content of the sizing bath was approximately 10%. The resulting roughened polyethylene film exhibited excellent printability.

*Example 11*

The procedure followed in this example comprised using a quench bath maintained at about 60–65° C. and containing a dispersion of particles of colloidal silica having a particle size of about 17 millimicrons. The solids content of the quench bath was varied from 1% to 30%. In this procedure, the molten polyethylene (about 0.0015″ in thickness) film was permitted to pass through an air gap of about 3–7 inches, and thereafter directly into the aqueous suspension of colloidal silica. Polyethylene films exhibiting excellent printability were obtained using casting speeds of about 13′ per minute at concentrations of solids in the quench bath ranging from 1% to 30%. Film prepared by employing a sizing composition containing 5% solids and passing the film through the quench bath at a rate of 26 feet per minute exhibited excellent printability, good printability being obtained using a rate of about 39 feet per minute.

It should be pointed out that the quench bath containing the suspension of colloidal particles of silica may be vibrated or agitated by employing sonic energy. Such means of agitation serve to provide for increasing the rate at which the polyethylene film may be conducted through the quench bath to obtain a film exhibiting excellent printability. Furthermore, after quenching the film in a bath containing dispersed particles, the film may thereafter be subjected to a pressing treatment, by feeding the film into the nip of hot pressing rolls, or the film may be treated by blowing hot air against its surface.

*Example 12*

This example illustrates the technique of embedding hot solid particles into the surface of a cool, solidified polyethylene film (about 0.005″ in thickness). The apparatus employed in this example was a "Schori" flame pistol. The technique comprised supporting the polyethylene film on the surface of a cold metal roll or plate and spraying the fine dust of particles through a flame which served to heat the particles. The hot particles were embedded in the surface of the polyethylene film, and the particles were rigidly retained in the surface upon cooling. Particles of various sizes of the following compositions were sprayed in accordance with the procedure of this example: hydrophobic silica, carbon black, calcium carbonate, copolymers of vinyl chloride and vinyl acetate, a polysulphide rubber composition, cellulose acetate, cadmium, zinc, lead, nickel, copper, iron, stainless steel, brass, tin, aluminum, and alumina. Particles of the foregoing materials were of various sizes, but only those particles which were 50 microns or below were satisfactory for producing a roughened polyethylene film having good to excellent printability, and retaining substantially its original degree of transparency. Specifically, the particles of hydrophobic silica, ranging from 8–10 millimicrons, with agglomerates ranging from 1 to 1½ microns, were sprayed at air pressures of 30, 40, and 50 p.s.i. at a distance of 2 inches from the film surface. The resulting roughened polyethylene films exhibited excellent printability. The use of air pressures of 10 and 20 p.s.i. resulted in producing film having good printability. The particles were heated immediately prior to being embedded into the polyethylene surface by employing a mixture of illuminating gas and oxygen.

As mentioned hereinbefore, the process of the present invention not only leads to the production of a thermoplastic film having excellent printability, but also provides a film which may be coated with adherent coatings of various other polymeric thermoplastic organic film-forming compositions. A cellulose nitrate coating (from a solution of cellulose nitrate in methyl ethyl ketone) was applied to each of the films produced in the foregoing examples. The adhesion of the coating to these films was markedly greater than to untreated polyethylene film. Only coating compositions which are composed of a major proportion of an ethylene polymer exhibit any satisfactory degree of adhesion to the surface of an untreated polyethylene film. Such coatings, however, are not particularly useful for improving various properties of polyethylene film such as increasing clarity, stiffness, gloss, dyeability, abrasion resistance, or for decreasing the permeability of a polyethylene film to organic vapors, oxygen, carbon dioxide and various odors. The following types of polymeric coatings may be applied to the roughened polyethylene film produced in accordance with the process of the present invention: polyamides of the type disclosed and claimed in United States Patents Nos. 2,071,251, 2,130,523, 2,285,009 and 2,430,860, specific examples of which are polyhexamethylene adipamide, polyhexamethylene sebacamide, and N-methoxymethyl hexamethylene adipamide; various polyesters of the type disclosed and claimed in United States Patent No. 2,071,251; polyvinyl acetals, such as polyvinyl butyral; various cellulose derivatives such as cellulose acetate, cellulose nitrate, ethyl cellulose and cellulose acetate butyrate; various rubber derivatives such as neoprene, chloroprene and other similar types of elastomeric materials; and a large class of vinyl and vinylidene compounds such as polyvinyl chloride, polyvinyl acetate, polyvinyl alcohol, vinyl chloride/vinyl acetate copolymers, copolymers of vinylidene chloride, such as vinylidene chloride/alkyl acrylate copolymers, vinylidene chloride/alkyl acrylate/ itaconic acid copolymers, hydrolyzed ethylene/vinyl acetate copolymers, and vinyl acetate/vinyl alcohol copolymers. Similarly, other thermoplastic polymer surfaces may be coated with different polymers to yield a composite of improved characteristics. Polymeric coatings may be applied to the roughened polyethylene film surface from solvent solutions, dispersions of the polymers in non-solvent mediums, e.g., water, and in the form of a hot melt.

The thermoplastic polymer surface roughened in accordance with the prevent process is also more readily adhered to itself and other base materials, such as metals, paper, woven or non-woven fabrics, glass, etc., by the use of adhesives or glues, or by merely a heat and pressure lamination step.

I claim:

1. A process for making polyethylene film receptive to organic coatings which comprises embedding colloidal silica particles in the surface of the pre-formed film while maintaining the points of embedment on the film in an amorphous state, said particles having their greatest dimension no greater than one-half the thickness of the film and not to exceed 50 microns, to form a product having a degree of transparency and a surface texture substantially equivalent to the film prior to embedment.

2. A process as in claim 1 wherein the particles have their greatest dimension from 8 to 20 millimicrons.

3. A process as in claim 1 wherein the surface of the film is molten.

4. A process as in claim 1 wherein the particles are embedded in the surface of the film by spraying said particles on the surface of said film while maintaining the particles at a temperature above the melting point of the film.

5. A process for making polyethylene film receptive to organic coatings which comprises embedding solid particles in the surface of the pre-formed film while maintaining the surface of the film in a molten state, said particles having their greatest dimension no greater than one-half the thickness of the film and not to exceed 50 microns, to form a product having a degree of transparency and a surface texture substantially equivalent to the film prior to embedment.

6. A process for making polyethylene film receptive to organic coatings which comprises spraying solid particles on the surface of the pre-formed film while maintaining the particles at a temperature above the melting point of the film, said particles having their greatest dimension no greater than one-half the thickness of the film and not to exceed 50 microns, to form a product having a degree of transparency and a surface texture substantially equivalent to the film prior to spraying.

References Cited in the file of this patent

UNITED STATES PATENTS

| | | |
|---|---|---|
| 1,775,631 | Carlton | Sept. 16, 1930 |
| 1,983,349 | Dreyfus | Dec. 4, 1934 |
| 2,034,008 | Taylor | Mar. 17, 1936 |
| 2,199,526 | McCowen | May 7, 1940 |
| 2,386,626 | Nadeau et al. | Oct. 9, 1945 |
| 2,431,873 | Kennelly | Dec. 2, 1947 |
| 2,433,515 | Jahoda | Dec. 30, 1947 |
| 2,220,140 | Bartling et al. | Nov. 5, 1950 |
| 2,523,037 | Mathes | Sept. 19, 1950 |
| 2,536,657 | Reese | Jan. 2, 1951 |
| 2,559,893 | Nadeau et al. | July 10, 1951 |
| 2,566,441 | Camras | Sept. 4, 1951 |
| 2,653,113 | Banigan | Sept. 22, 1953 |
| 2,678,285 | Browning | May 11, 1954 |
| 2,689,801 | D'Alelio | Sept. 21, 1954 |
| 2,697,058 | Lasak | Dec. 15, 1954 |
| 2,712,987 | Storrs et al. | July 12, 1955 |